March 4, 1958     L. L. GAGNON     2,825,267
OPHTHALMIC MOUNTINGS
Filed Aug. 28, 1952

INVENTOR.
Louis L. Gagnon

United States Patent Office 2,825,267
Patented Mar. 4, 1958

2,825,267

OPHTHALMIC MOUNTINGS

Louis L. Gagnon, Southbridge, Mass., assignor to American Optical Company, Southbridge, Mass., a voluntary association of Massachusetts Application August 28, 1952, Serial No. 306,877

2 Claims. (Cl. 88—47)

This invention relates to improvements in ophthalmic mountings and has particular reference to the provision of a lens supporting structure wherein the lenses may be clampingly held in assembled relation therewith.

One of the principal objects of the invention is to provide lenses with preformed attachment seats and a novel clamp-on lens supporting structure having engagement means resiliently retained in clamping engagement with said seats for releasably supporting the lenses.

Another object is to provide a mounting of the above character having portions shaped to blend with and effectively form continuations of the contour shapes of the lenses.

Another object is to provide a clamp-on lens supporting structure of the above character having means to which decorative members having different ornamental characteristics may be detachably assembled.

Another object is to provide lenses for use with lens supporting structures of the above character having preformed attachment seats on the nasal and temporal sides thereof recessed inwardly of the contour edges of the lenses in downwardly converging relation and terminating in cliff-like walls for automatically locating the lenses in accurate relation with the lens supporting structures.

Another object is to provide a clamp-on lens supporting structure of the above character wherein the lens seat and engagement means of the supporting structure for engaging said lens seat are so constructed as to retain the lens against rearward or forward tilting movement during the use of the mounting.

Another object is to provide a clamp-on lens structure of the above character which, after being resiliently seated on the lens, may be held in positive gripping relation with the lens by mechanical means which may function simultaneously as decorative means.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts, set forth as the preferred forms only have been given by way of illustration.

Referring to the drawings.

Figure 2:
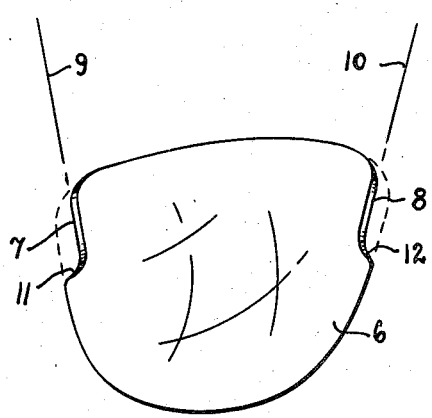
Fig. 2 is a front elevational view of a lens embodying the invention.
Figure 3:
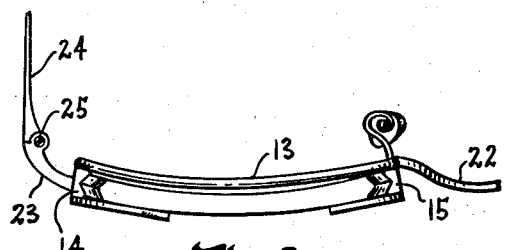
Fig. 3 is a plane view of the mounting illustrated in Fig. 1.
Figure 4:
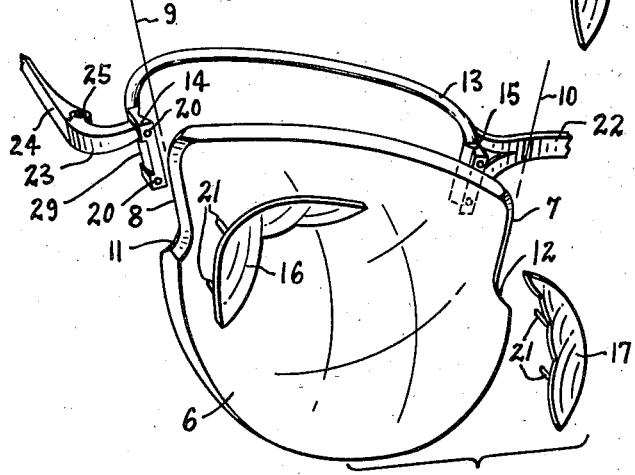
Fig. 4 is a fragmentary perspective view showing the parts of the mounting in disassociated relation.

The present invention as set forth in the drawings wherein like characters of reference designate like parts comprises a pair of lenses 6, as shown particularly in Figs. 2 and 4, each having preformed upper nasal and temporal edge portions 7 and 8 which are recessed so as to lie within the initial contour of the lens and which are beveled so as to converge with each other in a downward direction as indicated by the lines 9 and 10 and to form shouldered lower edge portions 11 and 12. It is to be understood, of course, that the initial shape of the lens is controlled so as to be formed in a conventional manner, that is, by conventional lens edging machines. The recesses having the beveled edges 7 and 8 may be controlled as to shape by the provision of suitable templates and may also be formed in a conventional manner.

The supporting structure comprises a pair of spring arms 13 shaped to lie rearwardly of the upper contour edge of each respective lens. The depending nasal and temporal portions of the spring arm 13 have secured thereto blocks 14 and 15 each having an inner beveled surface shaped to intimately fit with the beveled portions 7 and 8 of the lens and are also angled to lie along the said beveled edges so as to have a firm tong-like gripping action therewith. The said blocks 14 and 15 are dimensioned so as to lie within the recessed areas resulting from forming the respective beveled edges 7 and 8 and have secured to the front side thereof decorative trims 16 and 17, each having surface engravings and contour shapes which are such as to provide the decorative features desired. It is further pointed out, however, that the said trims 16 and 17 have outer contour shapes 18 and 19 which are so controlled as to form continuations of the initial contour shape of the lens when the mounting is viewed from the front, as clearly shown in Fig. 1. The said trims may be attached to the blocks by soldering or said blocks may be provided, as shown in Fig. 4, with suitable connection openings 20 for receiving pins, screws, or other attachment means 21 carried by the trims.

The spring arms 13 are connected on the nasal sides thereof by a bridge member 22 and have secured either directly thereto or to the block 14 an endpiece 23 to which a temple 24 may be pivotally connected as illustrated at 25.

It is further pointed out that while the decorative trims 16 and 17 are intended to replace the contour portions of the lenses which were removed in forming the downwardly angled beveled edges 7 and 8, they also function to introduce means for securing the upper portions of the lens between the resilient arm 13 and said decorative trims 16 and 17 whereby any tendency of the lens to tilt forwardly or rearwardly relative to the blocks 14 and 15 will be obviated. It is further pointed out that due to the connection means 21 the distance between the spring arm 13 and decorative trims 16 and 17 may be varied to compensate for variation in thickness of different lenses. In each instance, however, the decorative trims 17 and 18 are moved into positive engagement with the lens prior to being secured to the blocks 14 or 15 as the case may be.

Figure 5:
Fig. 5 is a perspective view of a modified part of the invention.

In Fig. 5 there is illustrated a modified feature of the invention wherein the decorative trim is in the form of a bar member 26 which may be formed of rigid or resilient material as desired and is provided with rearwardly extending tongues 27 and 28 which may be fitted within grooved outer surface portion 29 formed in the respective blocks 14 and 15. It is to be understood that the trim of Fig. 5 will replace the trims 16 and 17 and if formed rigid will function as positive mechanical lock means for preventing movement of the blocks 14 and 15 in an outward direction relative to each other, that is, after the blocks 14 and 15 have been placed in proper positional relation with the lens as permitted by the resilient arm 13 and held in gripping relation by said arm, the trim 26, if formed rigid, will function as a tie rod member for preventing outward movement of the blocks 14 and 15 relative to each other.

If the decorative trim 26 is formed of resilient material, particularly with resilient tongues 27 and 28, the said trim will function co-operatively with the spring arm 13 to more positively hold the blocks 14 and 15 in proper fitted relation with the beveled portions 7 and 8 of the lens. It is further pointed out that instead of tongues 27 and 28, the said trim 26 might be provided with pins, screws or other suitable means simulating the above means 21 and in which instance they would fit within openings such as 20. The said trims 26, like the trims 16 and 17 are provided with contour edge portions 30 and 31 for replacing the portions of the contour of the lens which were removed in order to form the beveled portions or seats 17 and 18.

Figure 6:
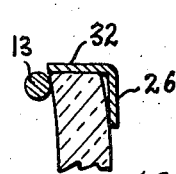
Fig. 6 is a fragmentary section view illustrating a further modification of the invention.

To aid in introducing rigidity to the trim, when so desired, it may be formed with an upper inwardly angled portion 32 shaped to overlie the upper contour edge of the lens as shown in section in Fig. 6. The rearwardly extending portion shaped to overlie the upper edge of the lens could be extended downwardly of the sides of the lens and could be formed with inwardly extending portions to fit either in the grooves or notches 29 or openings 20.

Figure 7:
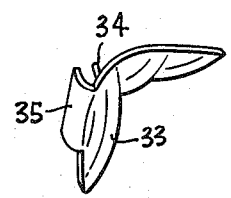
Fig. 7 is a perspective view of a decorative trim illustrating a further modification of the invention.

In Fig. 7 there is illustrated a further modification of the invention wherein the decorative trim 32, in addition to having anchor pins or other suitable connection means 34 for connection with the clamp blocks 14 and 15, are provided with an integral rearwardly extending side shield portion 35 adapted to overlie the major portion of the clamp blocks 14 and 15 and to conceal said blocks from view when the parts are in assembled relation with each other. The trim 33 may be formed to any desired contour shape and color in a manner similar to the trims previously described herein and said other trims may also be provided with similar side shield portions.

Figure 1:
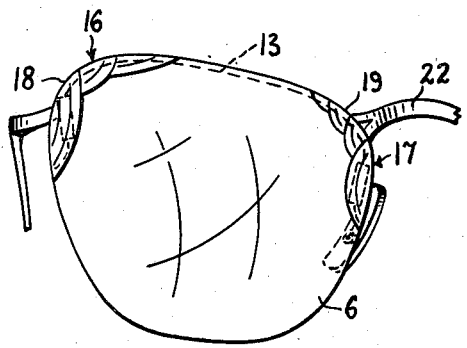
Fig. 1 is a fragmentary front elevational view of a mounting embodying the invention.

It is also pointed out that instead of having each of the trims provided with an outer contour edge portion shaped to follow and to form a continuation of the contour edges of the lenses as shown in Fig. 1, the outer contour edges may be formed to any desired shape or configuration. The said shields, however, must be dimensioned so as to conceal the clamp blocks 14 and 15 when the mounting is viewed from the front.

From the foregoing description it will be seen simple, efficient and economical means have been provided for accomplishing all of the objects and advantages of the invention.

Having described my invention, I claim:

1. An ophthalmic mounting embodying a pair of lenses having their upper nasal and temporal side edge portions recessed inwardly from the initial contour of the lenses so as to have downwardly and inwardly converging relatively straight recessed edge portions extending from the top to a point intermediate said nasal and temporal side edge portions of the lenses, said recessed relatively straight edge portions terminating in outwardly extending shouldered portions joining the lower ends of said recessed edge portions with the remainder of said side edge portions of the lenses, a pair of lens supporting members joined by a bridge member, each lens supporting member embodying a resilient intermediate portion shaped to follow adjacent the contour edge of each respective lens and having engagement portions on the opposite ends thereof, said engagement portions having inner downwardly and inwardly converging relatively straight inwardly grooved portions lying within the recessed portions and shaped to follow and engage in gripping relation with the relatively straight recessed edge portions and having their lower ends located adjacent the shouldered portions to properly correlate the lens supporting members with the respective lenses, said inner grooved portions being adapted to assume a gripping and holding relation with the relatively straight recessed edge portion of the respective lenses in response to the spring action of said resilient intermediate portions, said relatively straight downwardly and inwardly converging recessed edge portions functioning to prevent downward displacement of the lenses with respect to said engagement portions and said shouldered portions functioning to prevent upward displacement of the lenses with respect to said engagement portions whereby proper holding and positional relation of the lens supporting members with the lenses will be retained, said engagement portions having attachment means thereon and detachable trims having attachment means for connection with the attachment means on said engagement portions and being adapted to overlie the front sides of said engagement portions and the front sides of said recessed edge portions to conceal said recessed edge portions and said engagement portions when the mounting is viewed from the front.

2. An ophthalmic mounting embodying a pair of lenses having their upper nasal and temporal side edge portions recessed inwardly from the initial contour of the lenses so as to have downwardly and inwardly converging relatively straight recessed edge portions extending from the top to a point intermediate said nasal and temporal side edge portions of the lenses, said relatively straight edge portions being beveled and terminating in outwardly extending shouldered portions joining the lower ends of said recessed edge portions with the remainder of said side edge portions of the lenses, a pair of lens supporting members joined by a bridge member, each lens supporting member embodying a resilient intermediate portion shaped to follow adjacent the contour edge of each respective lens and having engagement portions on the opposite ends thereof, said engagement portions having inner downwardly and inwardly converging relatively straight inwardly beveled portions lying within the recessed portions and shaped to follow and engage in gripping relation with the relatively straight beveled recessed edge portions and having their lower ends located adjacent the shouldered portions to properly correlate the lens supporting members with the respective lenses, said inner beveled portions being adapted to assume a gripping and holding relation with the relatively straight beveled recessed edge portion of the respective lenses in response to the spring action of said resilient intermediate portions, said relatively straight downwardly and inwardly converging beveled recessed edge portions functioning to prevent downward displacement of the lenses with respect to said engagement portions and said shouldered portions functioning to prevent upward displacement of the lenses with respect to said engagement portions whereby proper holding and positional relation of the lens supporting members with the lenses will be retained, said engagement portions having attachment means thereon and detachable trims having attachment means for connection with the attachment means on said engagement portions and being adapted to overlie the front sides of said engagement portions and the front sides of said recessed edge portions to conceal said recessed edge portions and said engagement portions when the mounting is viewed from the front.

References Cited in the file of this patent

UNITED STATES PATENTS 2,254,746    Line _____ Sept. 2, 1941

(Other references on following page)

UNITED STATES PATENTS

| | | |
|---|---|---|
| 2,257,812 | Pomeranz | Oct. 7, 1941 |
| 2,277,118 | Leavitt | Mar. 24, 1942 |
| 2,383,572 | Splaine et al. | Aug. 28, 1945 |
| 2,385,975 | Ellestad | Oct. 2, 1945 |
| 2,513,214 | Stegeman | June 27, 1950 |
| 2,558,499 | Splaine | June 26, 1951 |
| 2,571,704 | Gilden | Oct. 16, 1951 |
| 2,599,463 | Lamb | June 3, 1952 |
| 2,629,196 | Splaine | Feb. 24, 1953 |
| 2,756,631 | Page | July 31, 1956 |

FOREIGN PATENTS

| | | |
|---|---|---|
| 968,497 | France | Apr. 26, 1950 |
| 640,977 | Great Britain | Aug. 2, 1950 |